United States Patent
Haga et al.

(10) Patent No.: US 9,257,874 B2
(45) Date of Patent: Feb. 9, 2016

(54) ROTOR UNIT, ROTATING ELECTRICAL MACHINE, AND METHOD OF MANUFACTURING ROTOR UNIT

(75) Inventors: Hidehiro Haga, Kyoto (JP); Keita Nakanishi, Kyoto (JP); Takayuki Migita, Kyoto (JP); Masato Aono, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 300 days.

(21) Appl. No.: 13/991,908

(22) PCT Filed: Apr. 2, 2012

(86) PCT No.: PCT/JP2012/002274
§ 371 (c)(1),
(2), (4) Date: Jun. 6, 2013

(87) PCT Pub. No.: WO2012/137465
PCT Pub. Date: Oct. 11, 2012

(65) Prior Publication Data
US 2013/0257211 A1    Oct. 3, 2013

(30) Foreign Application Priority Data
Apr. 2, 2011 (JP) .................. 2011-082323

(51) Int. Cl.
*H02K 21/12* (2006.01)
*H02K 1/27* (2006.01)
(Continued)

(52) U.S. Cl.
CPC ............... *H02K 1/274* (2013.01); *H02K 1/278* (2013.01); *H02K 15/03* (2013.01); *H02K 16/02* (2013.01); *Y10T 29/49012* (2015.01)

(58) Field of Classification Search
CPC ........ H02K 1/278; H02K 16/02; H02K 1/274
USPC ............................ 310/156.01–156.84; 29/596
See application file for complete search history.

(56) References Cited

U.S. PATENT DOCUMENTS 5,010,266 A * 4/1991 Uchida .................... 310/156.22
5,397,951 A   3/1995 Uchida et al.
(Continued)

FOREIGN PATENT DOCUMENTS

EP        0 569 594 B1    1/1997
JP       2010-141993 A    6/2010
(Continued)

OTHER PUBLICATIONS

Official Communication issued in International Patent Application No. PCT/JP2012/002274, mailed on Jun. 12, 2012.

*Primary Examiner* — Hanh Nguyen
(74) *Attorney, Agent, or Firm* — Keating & Bennett, LLP

(57) ABSTRACT

A rotor unit includes a plurality of rotating bodies arranged along a central axis. Each of the plurality of rotating bodies includes an annular rotor core surrounding the central axis, a plurality of magnets arranged in the circumferential direction around the rotor core, and a holder arranged to hold the magnets. Further, the holder includes a plurality of partitioning portions each axially extending between respective ones of the plurality of magnets. The axial dimension of the plurality of partitioning portions is longer than the axial dimension of the respective ones of the plurality of magnets which are held by the plurality of partitioning portions. Further, the plurality of rotating bodies is disposed in a state where the circumferential positions of the plurality of magnets are out of alignment.

15 Claims, 10 Drawing Sheets

(51) Int. Cl.
*H02K 15/03* (2006.01)
*H02K 16/02* (2006.01)

(56) References Cited

U.S. PATENT DOCUMENTS

| | | | |
|---|---|---|---|
| 7,332,845 B2* | 2/2008 | Heideman et al. | 310/216.011 |
| 7,906,880 B2* | 3/2011 | Okubo et al. | 310/156.25 |
| 2008/0048517 A1 | 2/2008 | Ochiai et al. | |
| 2009/0224620 A1* | 9/2009 | Okubo et al. | 310/156.25 |
| 2011/0291498 A1 | 12/2011 | Sakata et al. | |

FOREIGN PATENT DOCUMENTS

| | | |
|---|---|---|
| WO | 2006/008964 A1 | 1/2006 |
| WO | 2010/090303 A1 | 8/2010 |

* cited by examiner

ROTOR UNIT, ROTATING ELECTRICAL MACHINE, AND METHOD OF MANUFACTURING ROTOR UNIT

BACKGROUND OF THE INVENTION

1. Field of the Invention

The present invention relates to a rotor unit, a rotating electrical machine, and a method of manufacturing a rotor unit.

2. Description of the Related Art

In the past, an inner rotor-type of motor has been known in which a rotor unit having magnets is rotated inside a coil. For example, in WO 2006/008964A, a brushless motor provided with a stator and a rotor disposed inside the stator is described.

The rotor described in WO 2006/008964A has a rotor shaft, a rotor core, a magnet holder, and six rotor magnets. Further, in Paragraphs [0048] to [0051] and FIG. 8 of WO 2006/008964A, a rotor in a step-skewed form in which the rotor magnet on the front side and the rotor magnet on the back side are attached so as to be shifted in a step form is described.

However, in the example shown in FIG. 8 of WO 2006/008964A, contact between the magnet on the front side and the magnet on the back side is not prevented. For this reason, the magnets come into contact with each other due to impact during manufacturing, during transportation, or during use, so that there is concern that cracking or chipping may occur in the magnets on one or both sides. Cracking or chipping of the magnet causes a decrease in the magnetic properties of a motor and also becomes a factor for noise.

SUMMARY OF THE INVENTION

Preferred embodiments of the present invention provide a technique that reduces or prevents damage to magnets by preventing contact between the magnets in a rotor unit of a rotating electrical machine.

A first preferred embodiment of the present invention relates to a rotor unit arranged to rotate an electrical machine. The rotor unit arranged to rotate an electrical machine includes a plurality of rotating bodies which is arranged along a central axis. Each of the plurality of rotating bodies includes an annular rotor core which surrounds the central axis, a plurality of magnets which is arranged in the circumferential direction around the rotor core, and a holder which holds the plurality of magnets. The holder includes a plurality of partitioning portions each axially extending between the plurality of magnets. The axial dimension of the plurality of partitioning portions is longer than the axial dimension of the plurality of magnets which is held by the plurality of partitioning portions. The plurality of rotating bodies is disposed in a state where the circumferential positions of the plurality of magnets are out of alignment.

A second preferred embodiment of the present invention relates to a method of manufacturing a rotor unit for a rotating electrical machine. The rotor unit for a rotating electrical machine includes a plurality of rotating bodies. Each of the plurality of rotating bodies includes an annular rotor core which surrounds a central axis, a plurality of magnets which is arranged in the circumferential direction around the rotor core, and a holder made of resin, which holds the plurality of magnets. The method of manufacturing a rotor unit includes the following steps: (a) insert-molding the holder by disposing the rotor core inside a mold and injecting resin into the inside of the mold (the holder is molded into a shape including a plurality of partitioning portions axially extending along the outer circumferential surface of the rotor core); (b) respectively disposing the plurality of magnets between a pair of adjacent ones of the plurality of partitioning portions after step (a); and (c) axially arranging the plurality of rotating bodies fabricated by the steps (a) and (b). In step (a), the holder is molded such that the axial dimension of the plurality of partitioning portions becomes longer than the axial dimension of the plurality of magnets. In step (c), the plurality of rotating bodies is arranged in a state where the circumferential positions of the plurality of magnets are out of alignment.

According to the first preferred embodiment of the present invention, contact between the plurality of magnets is prevented. Accordingly, damage to each magnet can be significantly reduced or prevented.

According to the second preferred embodiment of the present invention, contact between the plurality of magnets is prevented. Accordingly, damage to each magnet can be significantly reduced or prevented. Further, by the insert molding, a process of manufacturing the rotor core and the holder is shortened. Further, as compared to a case where insert molding is performed including the magnets, a plurality of magnets can be easily and accurately positioned.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, exemplary preferred embodiments of the present invention will be described with reference to the drawings. In addition, in the following, the shape or the positional relationship of each section will be described with each of the surfaces facing each other of a first rotating body and a second rotating body set to be a "top surface" and each of the surfaces which are turned away from each other set to be a "bottom surface". However, these terms are those defined only for the convenience of explanation. These terms are not intended to limit the positions in use of a rotor unit and a rotating electrical machine which are related to various preferred embodiments of the present invention.

Figure 1:
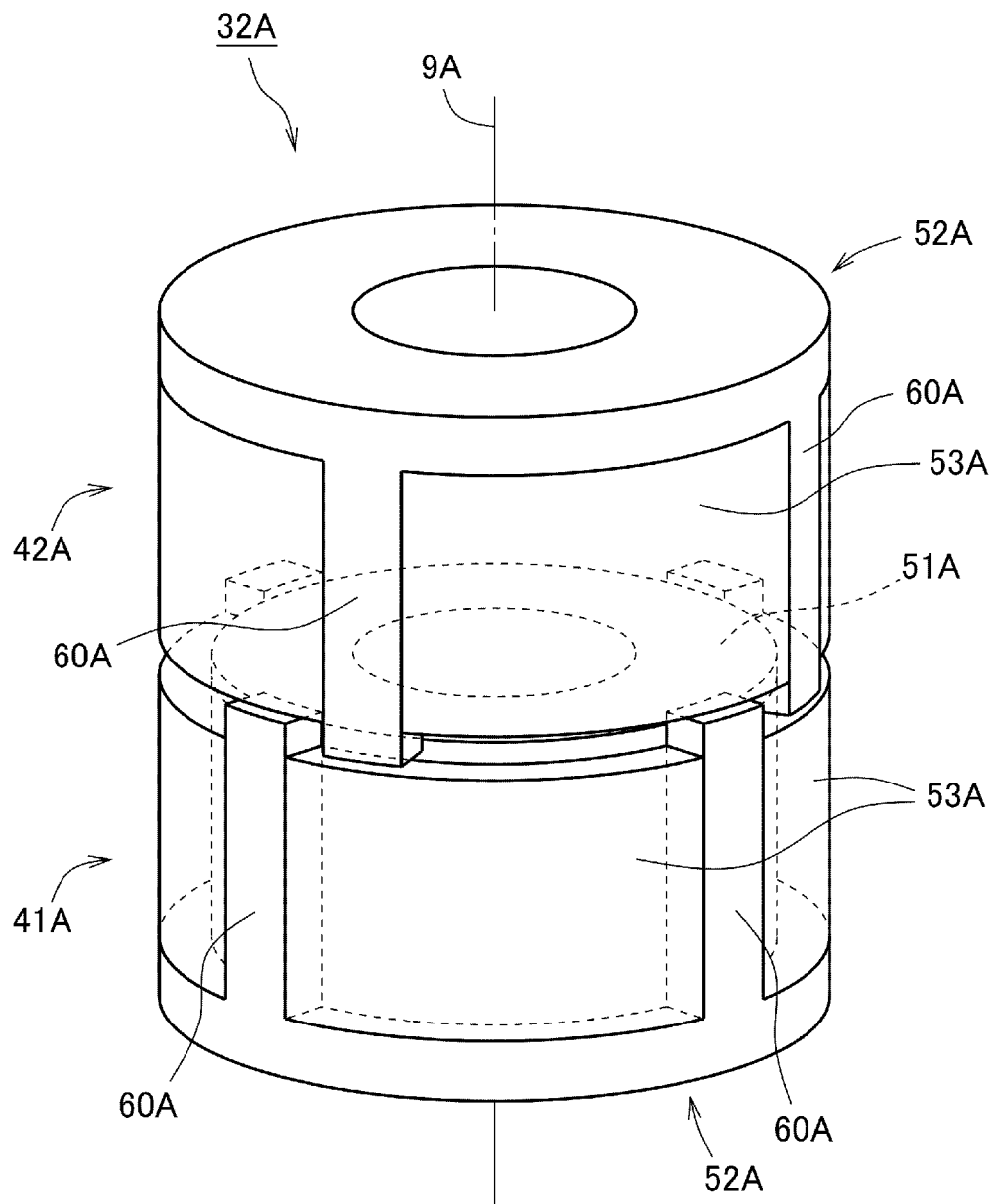
FIG. 1 is a perspective view of a rotor unit in accordance with a preferred embodiment of the present invention.

FIG. 1 is a perspective view of a rotor unit 32A for a rotating electrical machine according to a preferred embodiment of the present invention.

As shown in FIG. 1, the rotor unit 32A preferably includes two rotating bodies 41A and 42A. The two rotating bodies 41A and 42A are arranged along a central axis 9A. In addition, in FIG. 1, some hidden lines of the rotating body 41A are shown by dashed lines.

Each of the two rotating bodies 41A and 42A preferably includes a rotor core 51A, a holder 52A, and a plurality of magnets 53A. The rotor core 51A is an annular member surrounding the central axis 9A. The plurality of magnets 53A is arranged in the circumferential direction around the rotor core 51A and held by the holder 52A.

The holder 52A preferably includes a plurality of partitioning portions 60A each axially extending between the magnets 53A. As shown in FIG. 1, the axial dimension of each partitioning portion 60A is made longer than the axial dimension of the magnet 53A which is held by the partitioning portions 60A.

Further, the two rotating bodies 41A and 42A are disposed in a state where the circumferential positions of the plurality of magnets 53A are out of alignment. For this reason, the partitioning portion 60A restricts the axial movement of the magnet 53A. In this way, contact between the magnet 53A of the rotating body 41A on one side and the magnet 53A of the rotating body 42A on the other side is prevented. Therefore, damage to each magnet 53A is significantly reduced or prevented.

When manufacturing the rotor unit 32A, first, the rotor core 51A is preferably disposed inside a mold. Then, resin is injected into the inside of the mold. In this way, the holder 52A is insert-molded into a shape including the plurality of partitioning portions 60A. Here, the holder 52A is molded such that the axial dimension of the partitioning portion 60A becomes longer than the axial dimension of the magnet 53A. In the manufacturing process of the insert molding, both the molding of the holder 52A and the fixing of the rotor core 51A to the holder 52A are performed. For this reason, the process of manufacturing the rotor core 51A and the holder 52A is shortened.

Subsequently, the magnet 53A is disposed between a pair of adjacent partitioning portions 60A. If insert molding including the magnets is attempted, before the insert molding, it is necessary to fix the magnets to the rotor core at least once by adhesion or the like. In contrast to this, in this preferred embodiment, the magnets 53A are positioned by using the holder 52A after molding is completed and hardening is then performed. For this reason, as compared to the case of performing insert molding including the magnets 53A, the plurality of magnets 53A can be easily and accurately positioned.

Thereafter, the two rotating bodies 41A and 42A fabricated by the above process are arranged in the axial direction. At this time, the plurality of rotating bodies 41A and 42A is arranged in a state where the circumferential positions of the plurality of magnets 53A are out of alignment.

Subsequently, a more specific preferred embodiment of the present invention will be described.

Figure 2:
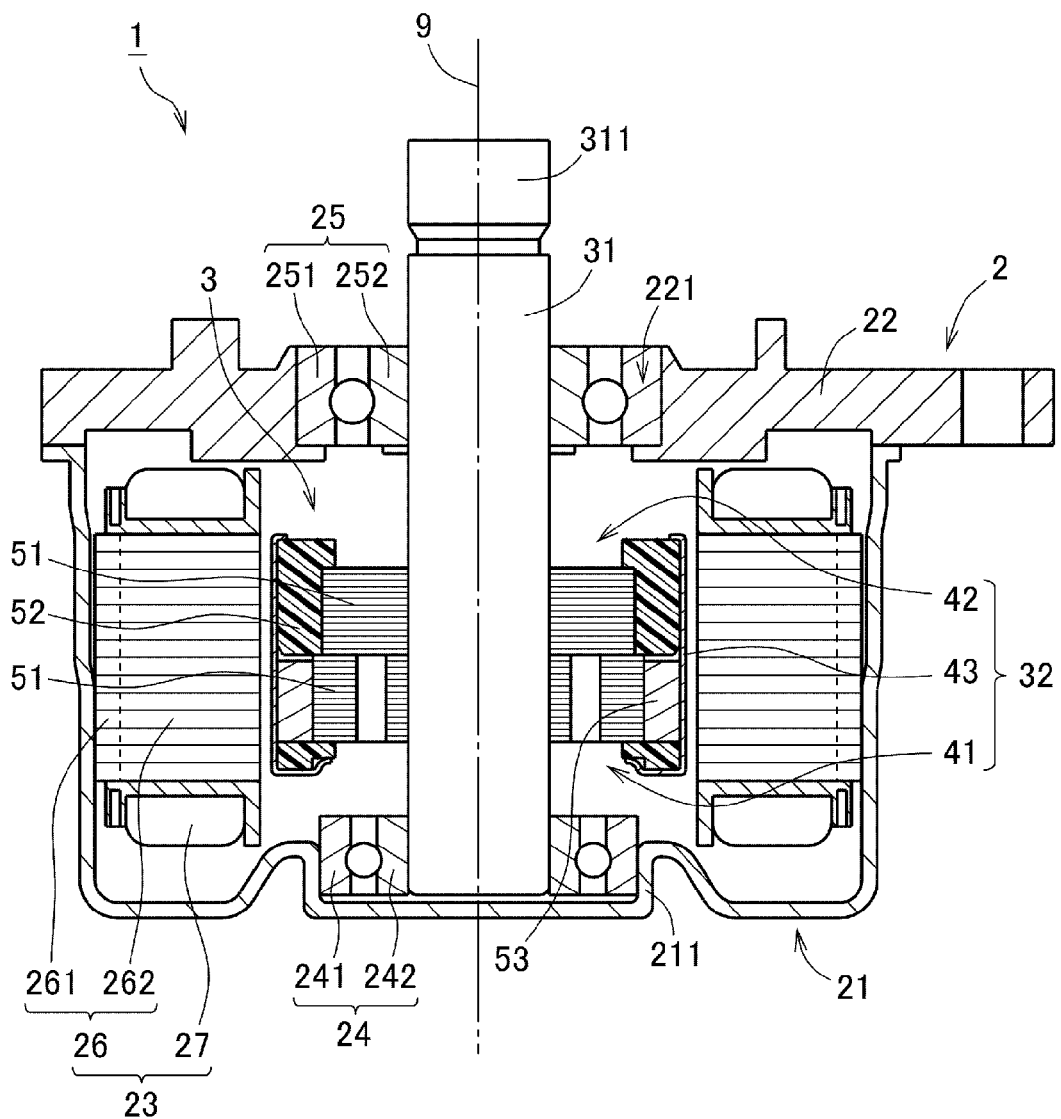
FIG. 2 is a longitudinal cross-sectional view of a motor in accordance with a preferred embodiment of the present invention.

FIG. 2 is a longitudinal cross-sectional view of a motor 1 that is one example of a rotating electrical machine in accordance with a preferred embodiment of the present invention. The motor 1 related to this preferred embodiment is preferably mounted on an automobile and generates the driving force of, for example, a power steering. As shown in FIG. 2, the motor 1 includes a stationary section 2 and a rotating section 3. The rotating section 3 is supported so as to be able to rotate with respect to the stationary section 2.

The stationary section 2 in this preferred embodiment preferably includes a housing 21, a lid section 22, an armature 23, a lower bearing section 24, and an upper bearing section 25.

The housing 21 is preferably a bottomed and cylindrical or approximately cylindrical case which accommodates the armature 23, the lower bearing section 24, and the rotating section 3 in the inside thereof. A concave portion 211 arranged to retain the lower bearing section 24 is preferably defined at the center of the lower surface of the housing 21. The lid section 22 is preferably a flat or substantially flat plate-shaped member which blocks an opening of an upper portion of the housing 21. A circular hole 221 arranged to retain the upper bearing section 25 is preferably provided at the center or approximate center of the lid section 22.

The armature 23 generates magnetic flux depending on a driving current. The armature 23 preferably includes a stator core 26 and a coil 27. The stator core 26 is preferably defined by laminated steel plates in which a plurality of steel plates is laminated in the axial direction (i.e., a direction along a central axis 9). The stator core 26 includes an annular core back 261 and a plurality of tooth portions 262 protruding from the core back 261 toward the inside in the radial direction (i.e., a direction perpendicular or substantially perpendicular to the central axis 9). The core back 261 is fixed to the inner circumferential surface of a side wall of the housing 21. The coil 27 is preferably defined by a conducting wire wound on each tooth portion 262 of the stator core 26.

The lower bearing section 24 and the upper bearing section 25 are mechanisms which rotatably support a shaft 31 on the rotating section 3 side. In each of the lower bearing section 24 and the upper bearing section 25 in this preferred embodiment, a ball bearing in which an outer race and an inner race are relatively rotated through a spherical body is preferably used. However, in place of the ball bearing, another type of bearing such as, for example, a plain bearing, a fluid bearing, etc. may also be used.

An outer race 241 of the lower bearing section 24 is preferably fixed to the concave portion 211 of the housing 21. Further, an outer race 251 of the upper bearing section 25 is preferably fixed to an edge of the circular hole 221 of the lid section 22. On the other hand, inner races 242 and 252 of the lower bearing section 24 and the upper bearing section 25 are preferably fixed to the shaft 31. For this reason, the shaft 31 is supported so as to be able to rotate with respect to the housing 21 and the lid section 22.

The rotating section 3 in this preferred embodiment preferably includes the shaft 31 and a rotor unit 32.

The shaft 31 is an approximately columnar member extending in the up-and-down direction along the central axis 9. The shaft 31 rotates around the central axis 9 while being supported on the lower bearing section 24 and the upper bearing section 25 described above. Further, the shaft 31 preferably includes a head portion 311 protruding above the lid section 22. The head portion 311 is preferably connected to, for example, a steering gear of an automobile through a power transmission mechanism such as, for example, a gear.

The rotor unit 32 is a unit which rotates along with the shaft 31 radially inside the armature 23. The rotor unit 32 preferably includes a first rotating body 41, a second rotating body 42, and a cover 43.

Each of the first rotating body 41 and the second rotating body 42 in this preferred embodiment preferably includes a rotor core 51, a magnet holder 52, and a plurality of magnets 53. The first rotating body 41 and the second rotating body 42 are arranged along the central axis 9 in a state where first surfaces where the magnets 53 are exposed face each other and second surfaces that are other end surfaces are turned away from each other.

The cover 43 is a cylindrical or approximately cylindrical member which retains the rotor unit 32. The cover 43 is arranged to cover the outer circumferential and a portion of each of both axial end surfaces of the rotor unit 32. In this way, the first rotating body 41 and the second rotating body 42 are maintained in the state of contacting each other.

In the motor 1, if a driving current is imparted to the coil 27 of the stationary section 2, radial magnetic flux is generated in a plurality of tooth portions 262 of the stator core 26. Then, circumferential torque is generated by the action of the magnetic flux between each tooth portion 262 and each magnet 53. As a result, the rotating section 3 rotates around the central axis 9 with respect to the stationary section 2. If the rotating section 3 rotates, a driving force is preferably transmitted to the steering gear, for example, connected to the shaft 31.

Subsequently, the more detailed structure of the rotor unit 32 will be described. As described above, the rotor unit 32 in this preferred embodiment preferably includes the first rotating body 41, the second rotating body 42, and the cover 43. In the following, first, the structures of the first rotating body 41 and the second rotating body 42 will be described.

Figure 3:
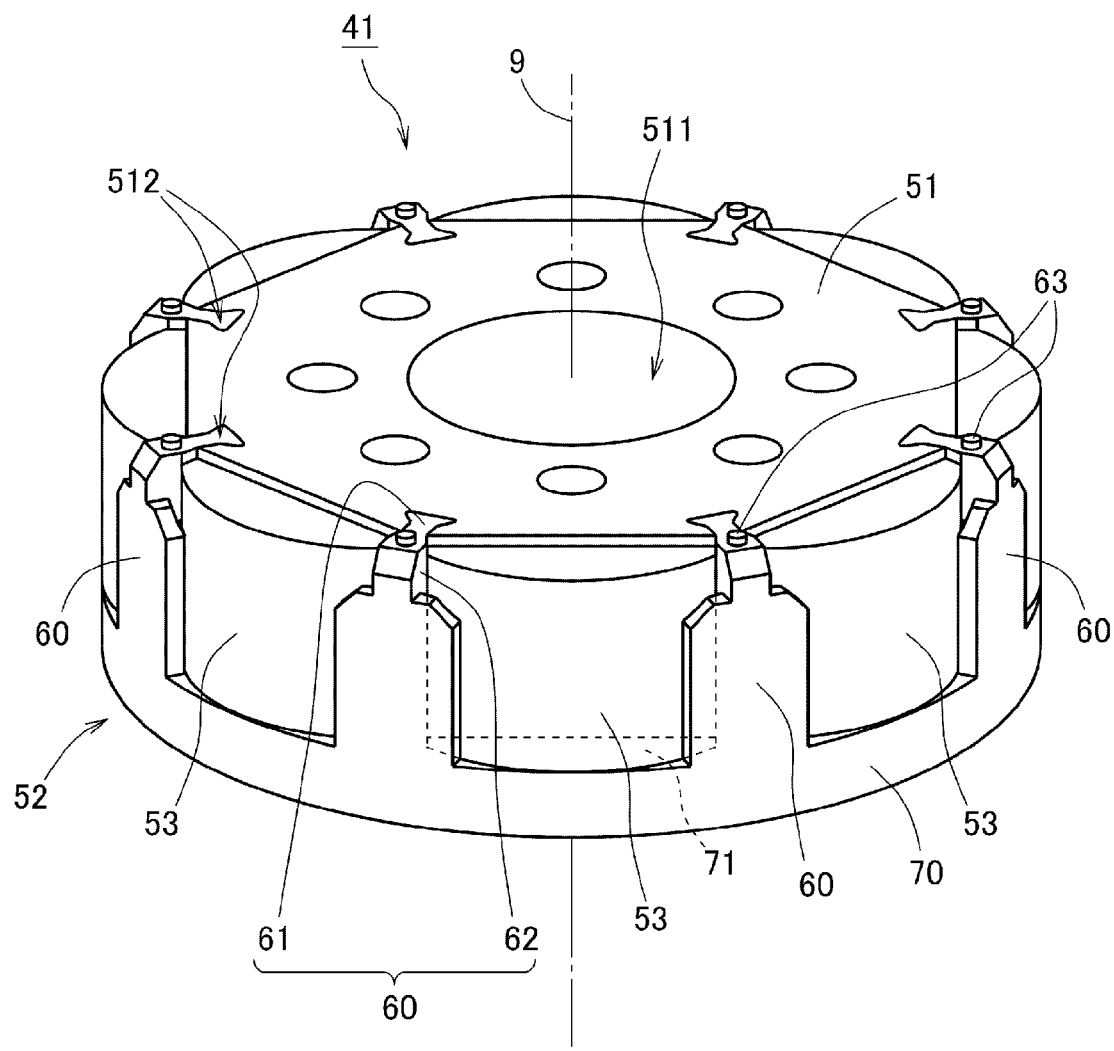
FIG. 3 is a perspective view of a first rotating body in accordance with a preferred embodiment of the present invention.
Figure 4:
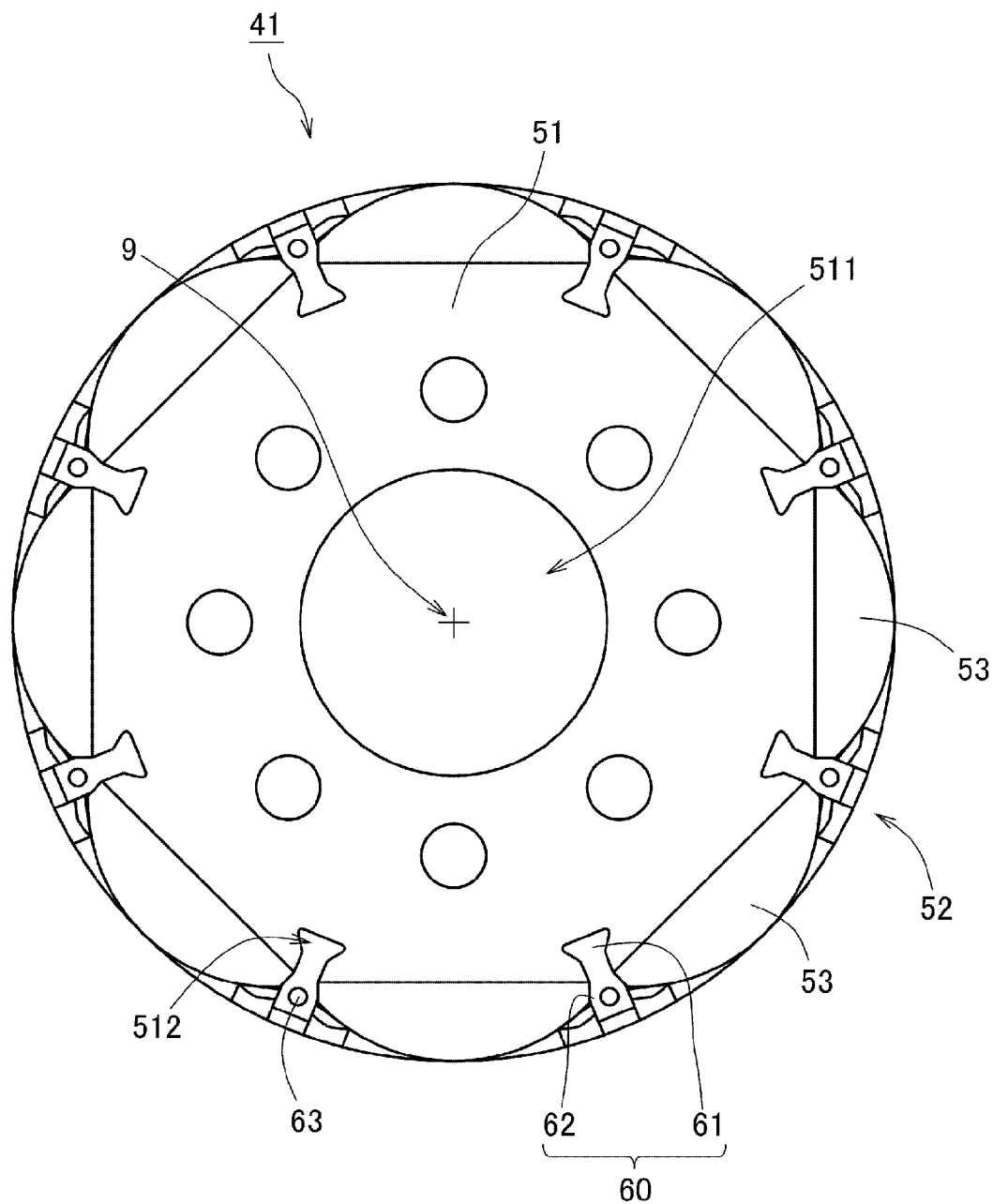
FIG. 4 is a top view of the first rotating body in accordance with a preferred embodiment of the present invention.

FIG. 3 is a perspective view of the first rotating body 41 according to a preferred embodiment of the present invention. FIG. 4 is a diagram showing the first rotating body 41 when viewed from the top surface side. As shown in FIGS. 3 and 4, the first rotating body 41 preferably includes the rotor core 51, the magnet holder 52, and the plurality of magnets 53.

The rotor core 51 is an annular member surrounding the central axis 9. A through-hole 511 into which the shaft 31 is inserted is preferably provided at the center of the rotor core 51. The rotor core 51 is preferably defined by laminated steel plates in which electromagnetic steel plates are laminated in the axial direction. The rotor core 51 in this preferred embodiment has an outer circumferential surface of an approximately regular polygonal column shape. A plurality of groove portions 512 extending in the axial direction is preferably provided in the outer circumferential surface of the rotor core 51. Each groove portion 512 is recessed radially inwardly at a boundary portion between the flat surfaces defining the outer circumferential surface of the rotor core 51.

The magnet holder 52 is preferably a member made of resin, which holds the magnets 53. The magnet holder 52 preferably includes a plurality of partitioning portions 60 and an annular connection portion 70 which connects end portions on the bottom surface side of the plurality of partitioning portions 60. The plurality of partitioning portions 60 is arranged at regular or approximately regular intervals in the circumferential direction. Each partitioning portion 60 axially extends along the side surface of the rotor core 51 in the vicinity of the groove portion 512 of the rotor core 51.

The partitioning portion 60 preferably includes an inner columnar portion 61 and an outer columnar portion 62. The inner columnar portion 61 axially extends in the groove portion 512, that is, farther towards the inside in the radial direction than the outer circumferential surface of the rotor core 51. In this preferred embodiment, an end portion on the top surface side of the inner columnar portion 61 is disposed at an axial position equal or approximately equal to the top surface of the rotor core 51. The outer columnar portion 62 axially extends farther towards the outside in the radial direction than the outer circumferential surface of the rotor core 51. A convex portion 63 protruding farther to the second rotating body 42 side than the top surface of the rotor core 51 is provided at an end portion on the top surface side of the outer columnar portion 62.

The plurality of magnets 53 is arranged around the rotor core 51. Each magnet 53 preferably includes a flat or approximately flat plate-shaped outer configuration and is press-fitted between a pair of adjacent partitioning portions 60. An end portion on the bottom surface side of the magnet 53 comes into contact with the connection portion 70 of the magnet holder 52. That is, the connection portion 70 of the magnet holder 52 preferably includes a contact surface 71 which contacts the end portion on the bottom surface side of the magnet 53.

The radially outer surface of the magnet 53 defines a magnetic pole surface which faces the armature 23. The plurality of magnets 53 is disposed at regular intervals in the circumferential direction in such a manner that an N-pole magnetic pole surface and an S-pole magnetic pole surface are alternately arranged. In addition, an Nd—Fe—B alloy-based sintered magnet, for example, can preferably be used as the magnet 53.

The second rotating body 42 in this preferred embodiment is disposed in a state where the top surface and the bottom surface are inverted. However, a structure itself is approximately the same as that of the first rotating body 41. That is, the second rotating body 42 preferably includes the rotor core 51, the magnet holder 52, and the plurality of magnets 53 which are the same as those of the first rotating body 41. With respect to the details of each section of the second rotating body 42, overlapping explanation will be omitted.

Figure 5:
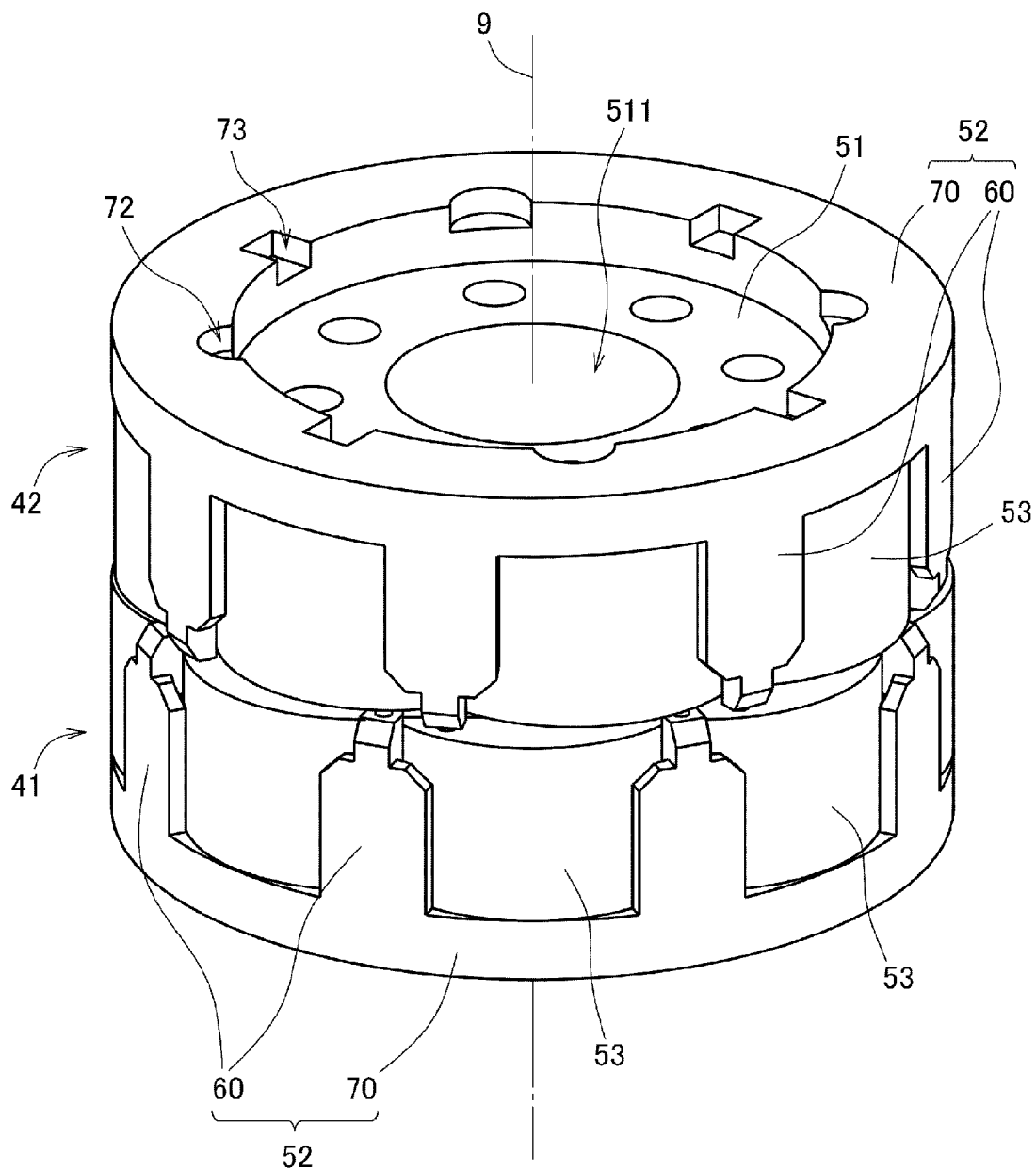
FIG. 5 is a perspective view of the first rotating body and a second rotating body in accordance with a preferred embodiment of the present invention.

FIG. 5 is a perspective view of the first rotating body 41 and the second rotating body 42 which are disposed inside the cover 43. As shown in FIG. 5, the first rotating body 41 and the second rotating body 42 are axially arranged in a state where the first surfaces face each other and the second surfaces are turned away from each other. Further, the first rotating body 41 and the second rotating body 42 are preferably arranged in a state where the circumferential positions of the plurality of magnets are out of alignment. In this manner, by making the circumferential positions of the plurality of magnets 53 be out of alignment, cogging or torque ripple of the motor 1 is reduced.

As described above, the end portion on the top surface side of the inner columnar portion 61 is disposed at an axial position equal or approximately equal to the top surface of the rotor core 51. Then, the convex portion 63 (refer to FIG. 3) is provided at a position farther to the outside in the radial direction than the outer circumferential surface of the rotor core 51. For this reason, in this preferred embodiment, the circumferential positions of the first rotating body 41 and the second rotating body 42 can be positioned out of alignment while bringing the rotor cores 51 into contact with each other. In addition, the end portion on the top surface side of the inner columnar portion 61 may also be located farther to the bottom surface side than the top surface of the rotor core 51.

Figure 6:
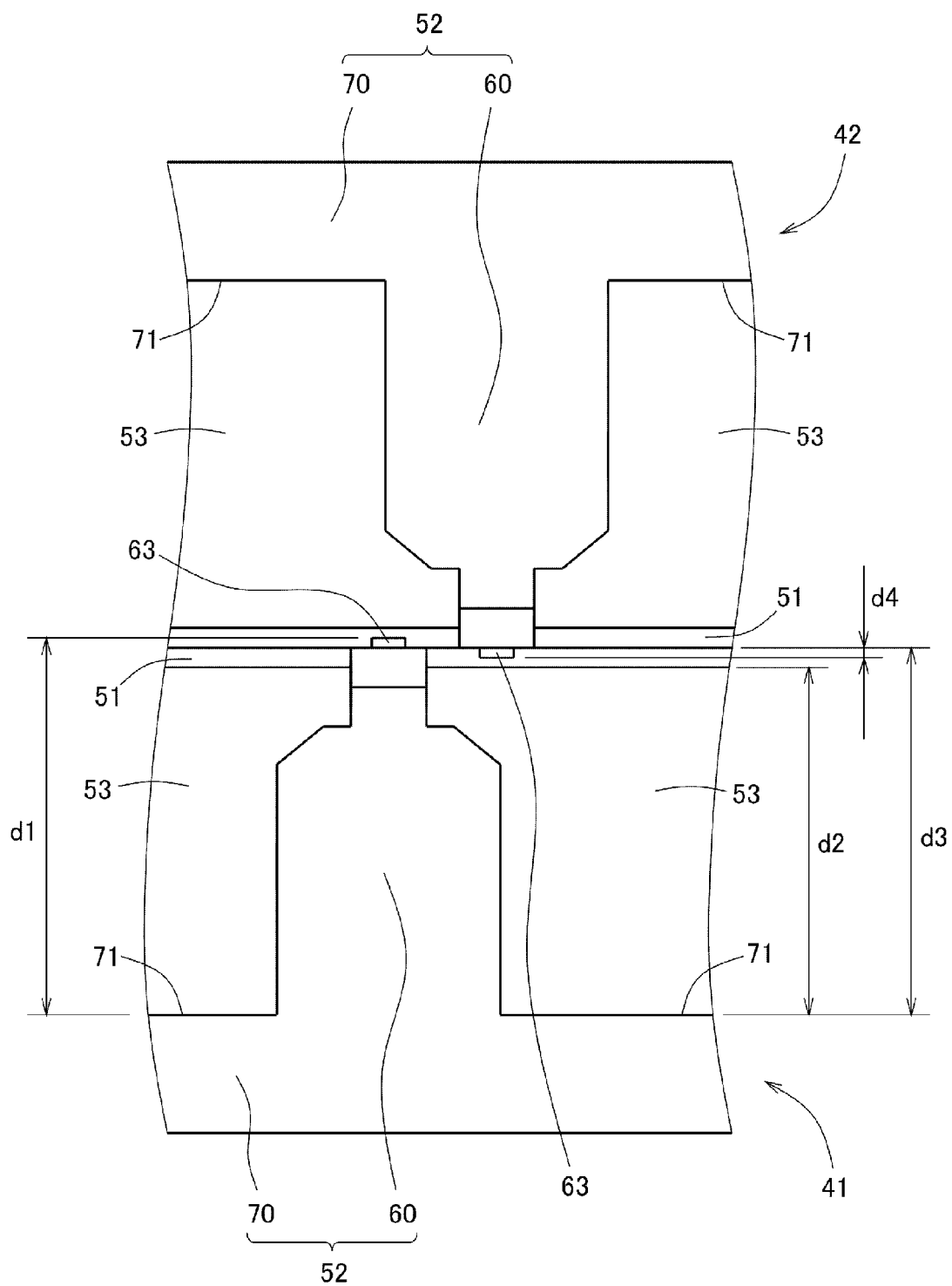
FIG. 6 is a partial side view of the first rotating body and the second rotating body in accordance with a preferred embodiment of the present invention.

FIG. 6 is a partial side view of the first rotating body 41 and the second rotating body 42. As shown in FIG. 6, in each of the rotating bodies 41 and 42, the axial dimension d1 from the contact surface 71 of the connection portion 70 to an end portion on the top surface side of the convex portion 63 is preferably longer than the axial dimension d2 of the magnet 53. For this reason, even if the axial position of the magnet 53 is shifted, before the magnets 53 come into contact with each other, an end portion on the top surface side of the magnet 53 comes into contact with the convex portion 63 of the rotating body on the other side. That is, the convex portion 63 of the partitioning portion 60 restricts axial movement of the magnet 53. In this way, contact between the magnets 53 is prevented. Therefore, damage to the magnet 53 can be significantly reduced or prevented.

In particular, the rotor core 51 in this preferred embodiment preferably has an outer shape of an approximately regular polygonal column shape. Then, the rotor cores 51 of the two rotating bodies 41 and 42 are disposed in a state where the circumferential positions thereof are out of alignment. For this reason, corner portions of the rotor core 51 of the rotating body on one side protrude to the outside in the radial direction of the rotor core 51 on the other side and axially face the magnets 53 of the rotating body on the other side. Therefore, if axial movement of the magnet 53 is not restricted, contact between the corner portion of the rotor core 51 and the magnet 53 can occur.

In this regard, in this preferred embodiment, the convex portions 63 of each rotating body preferably protrude farther to the other rotating body side than the top surface of the rotor core 51. That is, the axial dimension d1 from the contact surface 71 to the end portion on the top surface side of the convex portion 63 is longer than the axial dimension d3 from the contact surface 71 to the top surface of the rotor core 51. Further, the axial dimension d2 of the magnet 53 is shorter than the axial dimension d3 from the contact surface 71 to the top surface of the rotor core 51.

For this reason, even if the axial position of the magnet 53 is shifted, the magnet 53 comes into contact with the convex portion 63 of the rotating body on the other side before it comes into contact with the corner portion of the rotor core 51. In this manner, the partitioning portion 60 in this preferred embodiment preferably prevents not only contact between the magnets 53, but also contact between the rotor core 51 and the magnet 53. In this way, damage to the magnet 53 is further reduced or prevented.

Further, in this preferred embodiment, the axial dimension d3 from the contact surface 71 to the top surface of the rotor core 51 is preferably larger than the sum of the axial dimension d2 of the magnet 53 and the axial dimension d4 from the top surface of the rotor core 51 to the end portion on the top surface side of the convex portion 63. For this reason, a clearance is provided between the magnet 53 of the rotating body on one side and the convex portion 63 of the rotating body on the other side. Through this clearance, dimensional errors of each member can be absorbed.

In particular, the rotor core 51 in this preferred embodiment is preferably defined by laminated steel plates. For this reason, the axial dimension of the rotor core 51 is prone to varying. Therefore, approach of the magnets 53 to each other or approach of the rotor core 51 to the magnet 53 is prone to occurring. However, if the above-described dimensional relationship is satisfied, contact between the magnets 53 and contact between the rotor core 51 and the magnet 53 can be prevented.

Figure 7:
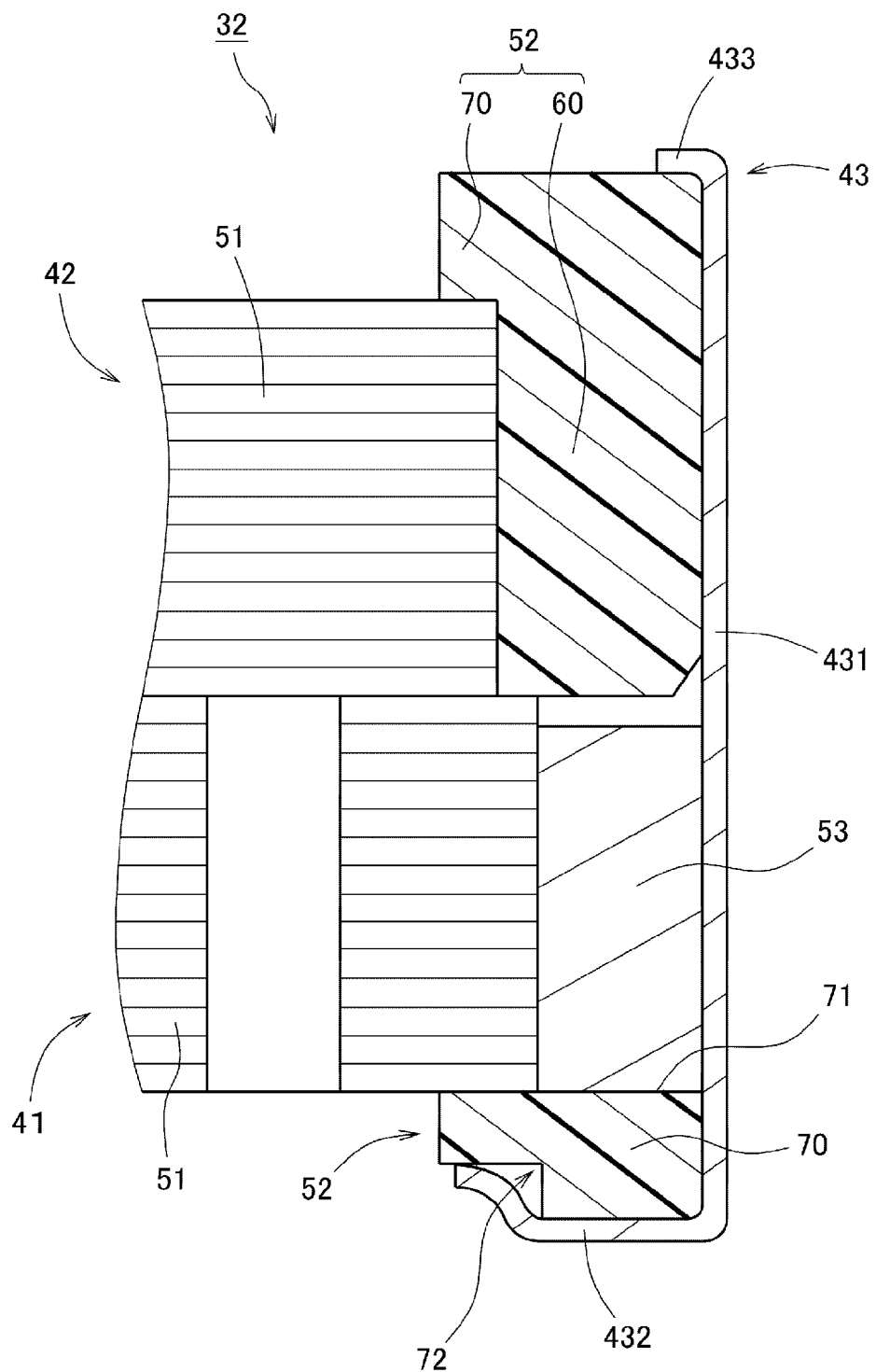
FIG. 7 is a partial longitudinal cross-sectional view of the rotor unit in accordance with a preferred embodiment of the present invention.

Subsequently, a fixing structure of the cover 43 to the first rotating body 41 and the second rotating body 42 will be described. The cover 43 is preferably made of a nonmagnetic metal such as, for example, aluminum, an aluminum alloy, stainless steel, etc. The cover 43 is preferably formed by, for example, press working or the like. FIG. 7 is a partial longitudinal cross-sectional view of the rotor unit 32. As shown in FIG. 7, the cover 43 preferably includes a cylindrical portion 431, a first annular swaged portion 432, and a second annular swaged portion 433. The cylindrical portion 431 surrounds the outer circumferential surfaces of the first rotating body 41 and the second rotating body 42. In addition, the cover 43 is not limited to nonmagnetic metal and may also be formed of nonmagnetic resin or the like.

The first annular swaged portion 432 is an annular portion folded radially inward along the bottom surface of the first rotating body 41. The first annular swaged portion 432 comes into contact with the bottom surface of the magnet holder 52 of the first rotating body 41. Here, in the bottom surface of the connection portion 70, a plurality of cutouts 72 and 73 shown in FIG. 5 is provided. A radially inner end portion of the first annular swaged portion 432 is preferably further swaged so as to be fitted into the cutouts 72 and 73. In this way, relative circumferential rotation around the central axis 9 of the first rotating body 41 and the cover 43 is prevented.

In addition, the plurality of cutouts 72 and 73 is provided at circumferential positions corresponding to the plurality of magnets 53, as shown in FIG. 5. Further, the plurality of cutouts 72 and 73 in this preferred embodiment preferably include a rectangular cutout 72 and a semicircular cutout 73 and the cutouts 72 and 73, which are therefore distinguishable in appearance, are arranged alternately in the circumferential direction. Even after the cover 43 is attached, the cutouts 72 and 73 are visible from the outside of the rotor unit 32. Therefore, the positions of an N pole and an S pole of the rotor unit 32 can be confirmed on the basis of the cutouts 72 and 73.

The second annular swaged portion 433 is preferably folded radially inward along an edge of the bottom surface on the second rotating body 42 side. The second annular swaged portion 433 comes into contact with the bottom surface of the magnet holder 52 of the second rotating body 42. The radial dimension of the second annular swaged portion 433 is preferably smaller than the radial dimension of the first annular swaged portion 432. In this way, occurrence of wrinkles in the second annular swaged portion 433 is significantly reduced or prevented.

The first rotating body 41 and the second rotating body 42 are sandwiched in between the first annular swaged portion 432 and the second annular swaged portion 433 in a state where the first rotating body 41 and the second rotating body 42 respectively come into contact with the first annular swaged portion 432 and the second annular swaged portion 433. In this way, the first rotating body 41 and the second rotating body 42 are held in the state of contacting each other. In this manner, the cover 43 in this preferred embodiment easily and reliably fixes the first rotating body 41 and the second rotating body 42 by swaging both end portions. The structure of the cover 43 can be widely applied to fixing of a plurality of rotating bodies arranged axially, without being limited to the first rotating body 41 and the second rotating body 42 in this preferred embodiment.

Figure 8:
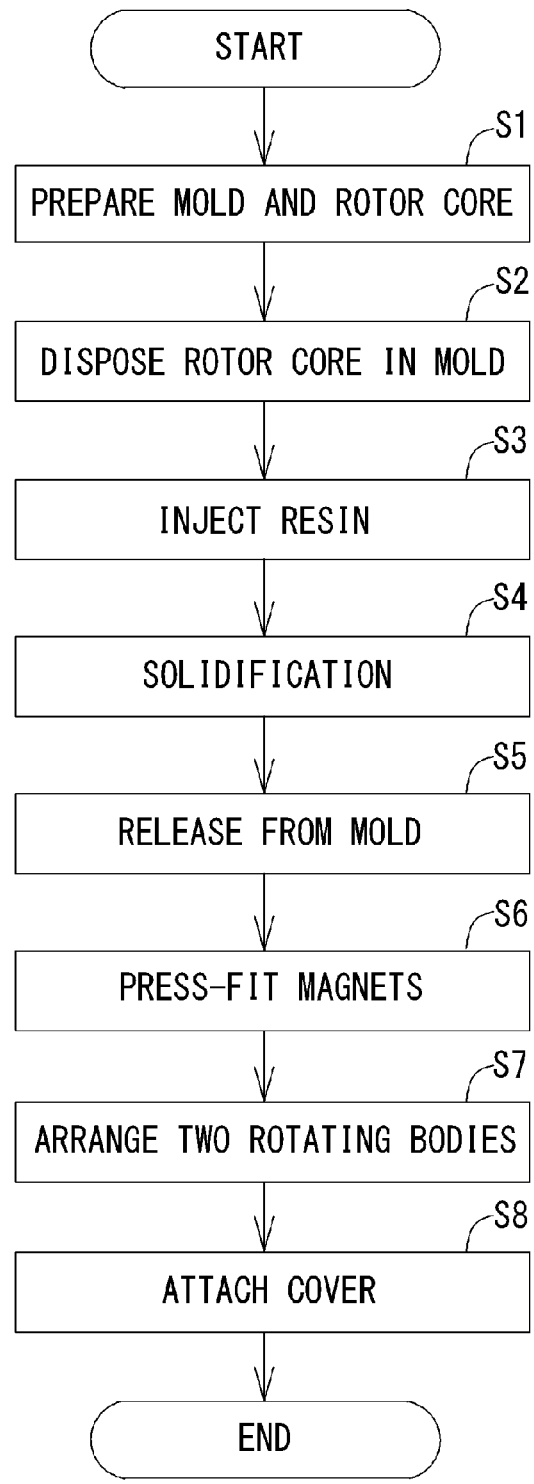
FIG. 8 is a flowchart showing manufacturing procedure of the rotor unit in accordance with a preferred embodiment of the present invention.

Subsequently, one example of a method of manufacturing the rotor unit 32 will be described with reference to the flowchart of FIG. 8.

When manufacturing the rotor unit 32, first, a pair of molds and the prefabricated rotor core 51 are prepared (Step S1). The rotor core 51 is preferably fabricated by axially laminating punching-worked steel plates, for example. The pair of molds define a cavity corresponding to the shapes of the rotor core 51 and the magnet holder 52 in the inside thereof by bringing the opposed surfaces thereof into contact with each other.

Next, the rotor core 51 is disposed inside the pair of molds (Step S2). Here, first, the rotor core 51 is disposed inside the mold on one side. Then, an upper portion of the above mold is blocked by the mold on the other side. In this way, a state is created where a cavity is defined inside the molds and the rotor core 51 is disposed in the cavity.

Subsequently, resin in a fluid state is injected into the cavity defined inside the molds (Step S3). Here, resin in a fluid state is preferably injected into the cavity in the mold through a runner provided at the mold.

Once the resin has spread completely throughout the cavity in the mold, the resin in the mold is subsequently cooled and solidified (Step S4). The resin in the mold is solidified such that it is turned into the magnet holder 52. Further, the rotor core 51 and the magnet holder 52 are fixed to each other along with the solidification of the resin. The magnet holder 52 is molded so as to have the plurality of partitioning portions 60 and the connection portion 70 and satisfy the above-described dimensional relationship in FIG. 6.

Thereafter, the pair of molds is opened and the rotor core 51 and the magnet holder 52 are then released from the molds (Step S5).

The above Steps S1 to S5 are one example of insert molding. At the time of the insert molding, both the molding of the magnet holder 52 and the fixing of the rotor core 51 to the magnet holder 52 are performed. For this reason, compared to a case where the rotor core 51 and the magnet holder 52 are separately fabricated and fixed to each other, the process of manufacturing the rotor core 51 and the magnet holder 52 can be shortened.

At the time of the insert molding, it is preferable to position the rotor core 51 by bringing the top surface of the rotor core 51 into contact with the mold on one side. That is, it is preferable to axially position the rotor core 51 inside the pair of molds with the top surface side as a standard. If the rotor core 51 is positioned with the top surface side as a standard, even if variation is present in the axial dimension of the rotor core 51, the thickness of the connection portion 70 of the magnet holder 52 is increased or decreased depending on the variation. Therefore, the dimensional relationship of d1 to d4 described above can be realized regardless of variation in the axial dimension of the rotor core 51.

Once the insert molding is completed, the magnet 53 is subsequently prepared and press-fitted between a pair of adjacent outer columnar portions 62 (Step S6). Then, the bottom surface of the magnet 53 is preferably brought into contact with the contact surface 71 of the connection portion 70. The axial and circumferential positions of the magnet 53 are determined by the contact surface 71 and the outer columnar portion 62 of the magnet holder 52.

If a plurality of magnets is attempted to be disposed inside the mold during the insert molding, the structure of the mold will necessarily become much more complicated in order to perform positioning of the magnets with respect to the rotor core. Or, it is necessary to fix the magnets to the rotor core once by adhesion or the like before insert molding. In contrast to this, in this preferred embodiment, the magnet 53 is positioned by using the magnet holder 52 after the insert molding is completed and solidification is performed. For this reason, it is possible to easily and accurately position a plurality of magnets 53.

Each of the first rotating body 41 and the second rotating body 42 is fabricated by the above Steps S1 to S6. In this preferred embodiment, the magnet holder 52 of the first rotating body 41 and the magnet holder 52 of the second rotating body 42 have approximately the same shape. For this reason, during the insert molding, it is possible to fabricate the magnet holder 52 of each of the rotating bodies 41 and 42 by using the same mold.

Next, the first rotating body 41 and the second rotating body 42 are arranged axially (Step S7). Here, the first rotating body 41 and the second rotating body 42 are arranged in a state where the top surfaces of both the rotating bodies 41 and 42 face each other, the bottom surfaces of both the rotating bodies 41 and 42 are turned away from each other, and the circumferential positions of the plurality of magnets 53 are out of alignment.

Thereafter, the cover 43 is attached to the first rotating body 41 and the second rotating body 42 (Step S8). Here, after the first rotating body 41 and the second rotating body 42 are inserted inside the cylindrical cover 43, both end portions of the cover 43 are swaged so as to form the first swaged portion 432 and the second swaged portion 433. In this way, the first rotating body 41 and the second rotating body 42 are fixed to each other in the state of contacting each other.

Figure 9:
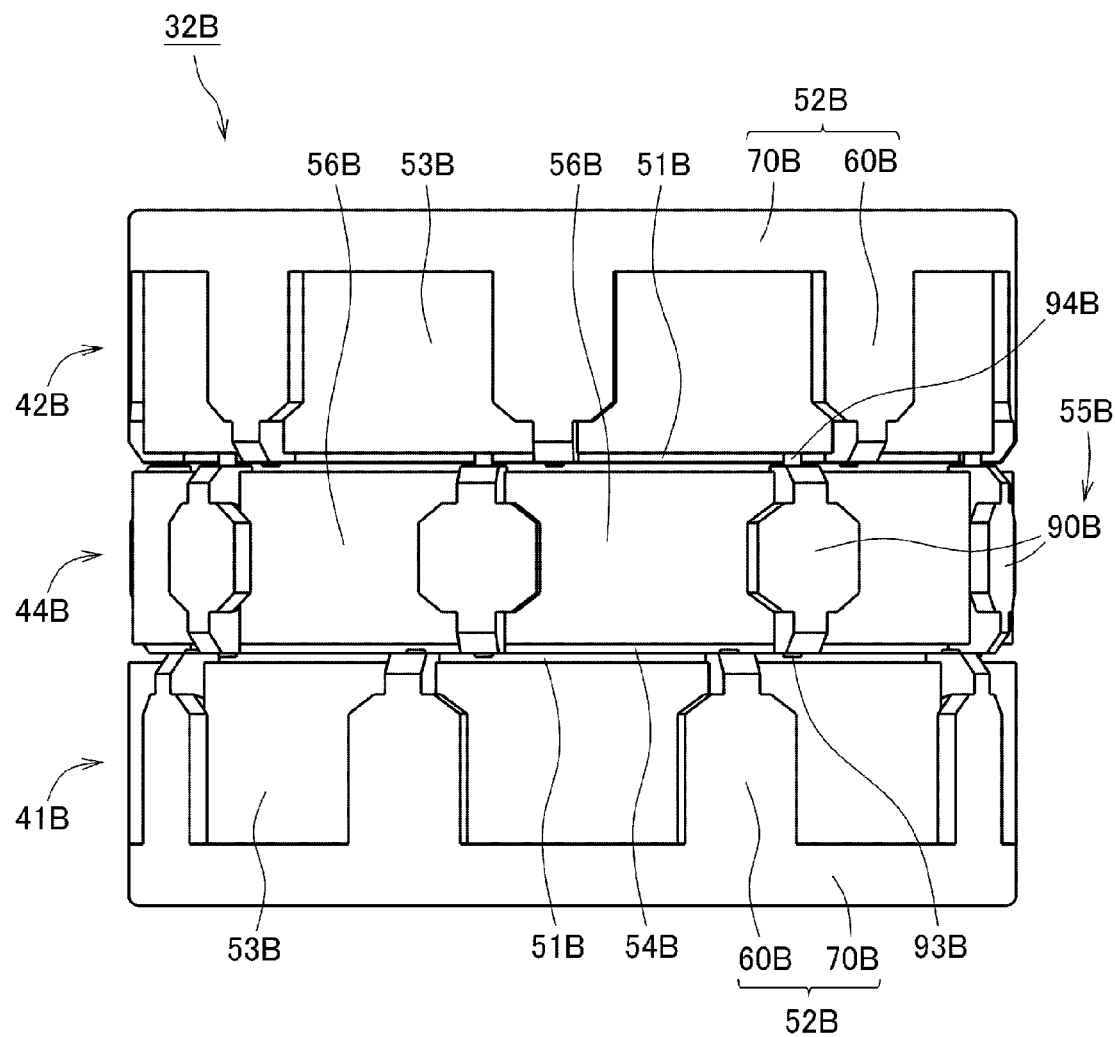
FIG. 9 is a side view of a first rotating body, a second rotating body, and a central rotating body in accordance with a preferred embodiment of the present invention.

Subsequently, another preferred embodiment of the present invention will be described focusing on differences between it and the above-described preferred embodiment. FIG. 9 is a side view of a rotor unit 32B related to another preferred embodiment. In FIG. 9, illustration of the cover is omitted. As shown in FIG. 9, the rotor unit 32B preferably includes a first rotating body 41B, a second rotating body 42B, and a central rotating body 44B.

The structures of the first rotating body 41B and the second rotating body 42B are preferably the same as those of the first rotating body 41 and the second rotating body 42 in the above-described preferred embodiment. That is, each of the first rotating body 41B and the second rotating body 42B preferably includes a rotor core 51B, a magnet holder 52B, and a plurality of magnets 53B, which are similar to those in the above-described preferred embodiments. With respect to the details of each section, overlapping explanation will be omitted.

The central rotating body 44B preferably includes a central rotor core 54B, a central magnet holder 55B, and a plurality of central magnets 56B. As the central rotor core 54B in this preferred embodiment, a rotor core similar to the rotor core 51B of each of the first rotating body 41B and the second rotating body 42B is preferably used. The central rotor core 54B is fixed to a shaft between a pair of rotor cores 51B.

Further, as the central magnet 56B in this preferred embodiment, a magnet similar to the magnet 53B of each of the first rotating body 41B and the second rotating body 42B is preferably used. The plurality of central magnets 56B is arranged at regular intervals around the central rotor core 54B. The number of central magnets 56B that the central rotating body 44B includes is preferably made to be the same as the number of magnets 53B that each of the first rotating body 41B and the second rotating body 42B includes.

The central magnet holder 55B is preferably a member made of resin, which holds the central magnets 56B. The central magnet holder 55B is different from the magnet holders 52B of the first rotating body 41B and the second rotating body 42B in that the central magnet holder 55B does not include a connection portion 70B. The central magnet holder 55B preferably includes a plurality of central partitioning portions 90B. Each central partitioning portion 90B axially extends between the central magnets 56B adjacent to each other.

A first convex portion 93B is preferably provided at an end portion on the first rotating body 41B side of each central partitioning portion 90B. The first convex portion 93B protrudes farther to the first rotating body 41B side than an end portion on the first rotating body 41B side of the central rotor core 54B. Further, a second convex portion 94B is preferably provided at an end portion on the second rotating body 42B side of each central partitioning portion 90B. The second convex portion 94B protrudes farther to the second rotating body 42B side than an end portion on the second rotating body 42B side of the central rotor core 54B.

As shown in FIG. 9, the first rotating body 41B and the second rotating body 42B are preferably axially arranged in a state where first surfaces face each other and second surfaces are turned away from each other. Further, the central rotating body 44B is disposed between the first rotating body 41B and the second rotating body 42B. The first rotating body 41B, the central rotating body 44B, and the second rotating body 42B are preferably arranged in a state where the circumferential positions of the plurality of magnets 53B and 56B are out of alignment. In this manner, by making the circumferential positions of the plurality of magnets 53B and 56B be out of alignment, cogging or torque ripple of a motor is preferably reduced.

Figure 10:
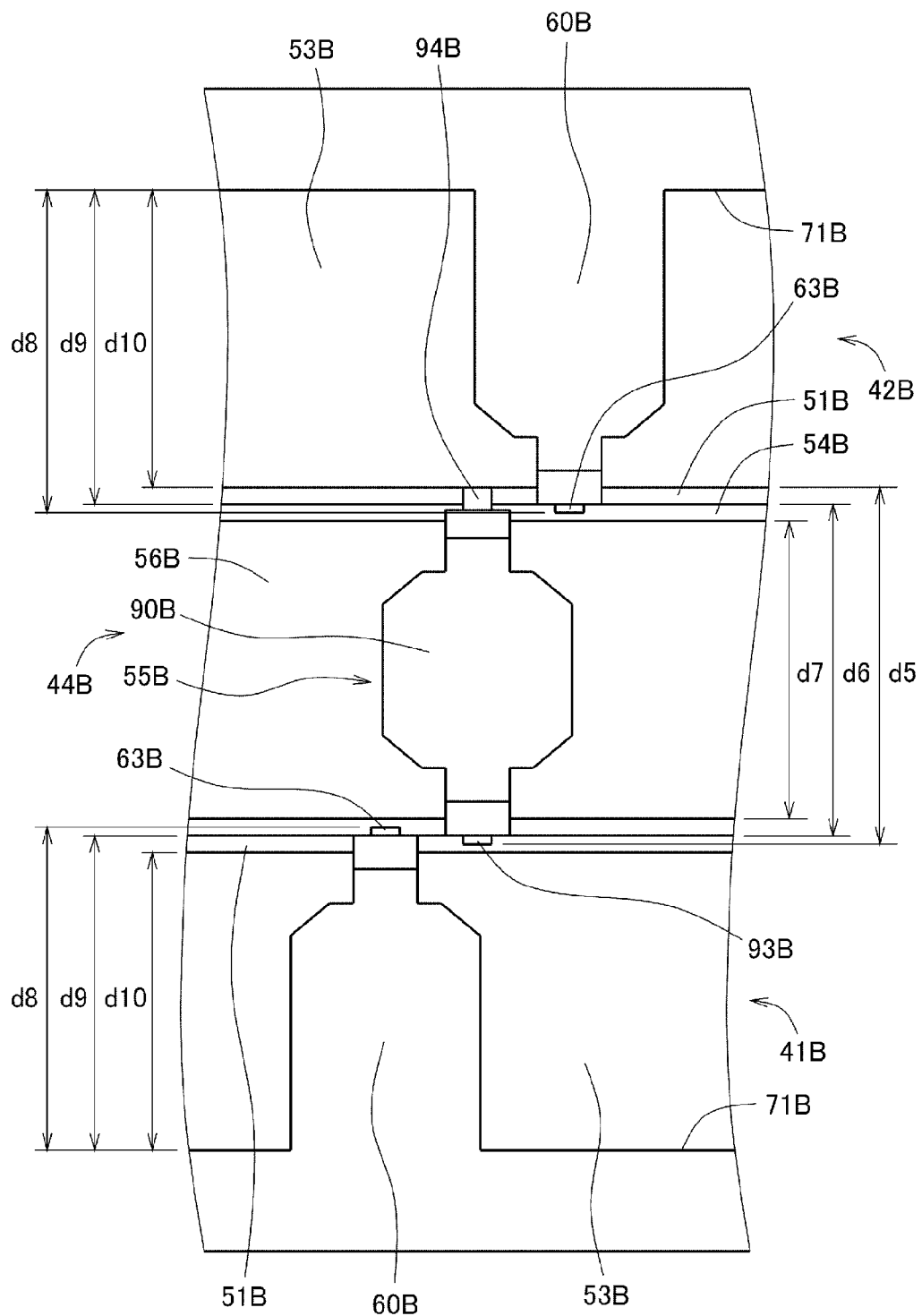
FIG. 10 is a partial side view of the first rotating body, the second rotating body, and the central rotating body in accordance with a preferred embodiment of the present invention.

FIG. 10 is a partial side view of the first rotating body 41B, the second rotating body 42B, and the central rotating body 44B. As shown in FIG. 10, the axial dimension d5 of the central partitioning portion 90B, that is, the axial dimension d5 from an end portion on the first rotating body 41B side of the first convex portion 93B to an end portion on the second rotating body 42B side of the second convex portion 94B is preferably longer than the axial dimension d6 of the central rotor core 54B. Further, the axial dimension d7 of the central magnet 56B is preferably shorter than the axial dimension d6 of the central rotor core 54B. Then, the central magnet 56B is disposed between a convex portion 63B provided at a partitioning portion 60B of the first rotating body 41B and a convex portion 63B provided at a partitioning portion 60B of the second rotating body 42B.

For this reason, even if the axial position of the central magnet 56B is shifted, before the central magnet 56B comes into contact with another magnet 53B or the rotor core 51B, the end surface of the central magnet 56B comes into contact with the convex portion 63B of the first rotating body 41B or the second rotating body 42B. In this manner, the convex portions 63B of the partitioning portions 60B of the first rotating body 41B and the second rotating body 42B restrict axial movement of the central magnet 56B. In this way, damage to the central magnet 56B is significantly reduced or prevented.

Further, in each of the first rotating body 41B and the second rotating body 42B, the axial dimension d8 from a contact surface 71B to an end portion on the top surface side of the convex portion 63B is preferably longer than the axial dimension d9 from the contact surface 71B to the top surface of the rotor core 51B. Further, the axial dimension d10 of the magnet 53B is preferably shorter than the axial dimension d9 from the contact surface 71B to the top surface of the rotor core 51B. Then, the magnet 53B is disposed between the contact surface 71B and the first convex portion 93B or the second convex portion 94B provided at the central partitioning portion 90B.

In the example shown in FIG. 10, a clearance is provided between the first convex portion 93B and the top surface of the magnet 53B of the first rotating body 41B. Through this clearance, dimensional errors of each member are allowed. Further, even if the axial position of the magnet 53B of the first rotating body 41B is shifted, the end surface of the magnet 53B preferably comes into contact with the first convex portion 93B before the magnet 53B comes into contact with the central magnet 56B or the central rotor core 54B. In this manner, the first convex portion 93B of the central partitioning portions 90B restricts axial movement of the magnet 53B of the first rotating body 41B. In this way, damage to the magnet 53B is significantly reduced or prevented.

On the other hand, the second convex portion 94B comes into contact with the top surface of the magnet 53B of the second rotating body 42B. That is, in this preferred embodiment, the magnet 53B of the second rotating body 42B preferably comes into contact with both the contact surface 71B of the second rotating body 42B and the second convex portion 94B. In this way, the shift itself of the axial position of the magnet 53B of the second rotating body 42B is prevented.

The central rotating body 44B is preferably fabricated by a manufacturing method based on the method of manufacturing the first rotating body 41B or the second rotating body 42B in the above-described preferred embodiments. The central magnet holder 55B is preferably insert-molded after the central rotor core 54B is disposed inside a mold.

At the time of the insert molding, for example, the end surface on the first rotating body 41B side of the central rotor core 54B is brought into contact with a mold on one side. That is, the central rotor core 54B is axially positioned inside a pair of molds with the end surface on the first rotating body 41B side as a standard. Because of this, it is possible to make the first convex portion 93B protrude from the end surface on the first rotating body 41B side of the central rotor core 54B regardless of variation in the axial dimension of the central rotor core 54B.

However, if the central rotor core 54B is positioned with the end surface on the first rotating body 41B side as a standard, a positional relationship between the end surface on the second rotating body 42B side of the central rotor core 54B and the end portion on the second rotating body 42B side of the second convex portion 94B is varied by variation in the axial dimension of the central rotor core 54B. For this reason, in this preferred embodiment, the second convex portion 94B is preferably molded to be longer than the first convex portion 93B such that the second convex portion 94B necessarily protrudes from the end surface on the second rotating body 42B side of the central rotor core 54B. Then, when the second rotating body 42B and the central rotating body 44B are disposed, a leading end portion of the second convex portion 94B is pressed against the magnet 53B of the second rotating body 42B so as to be crushed, whereby the dimension of the second convex portion 94B is adjusted.

Further, in this preferred embodiment, the dimensions of the central rotor core 54B and the central magnet holder 55B are set such that the end surface on the second rotating body 42B side of the central rotor core 54B is preferably disposed farther to the second rotating body 42B side than a base end portion of the second convex portion 94B regardless of variation in the axial dimension of the central rotor core 54B. In this way, the end surface on the second rotating body 42B side of the central rotor core 54B and the top surface of the rotor core 51B of the second rotating body 42B are made to contact each other.

Features of the above-described preferred embodiments and the modifications thereof may be combined appropriately as long as no conflict arises.

For example, the outer circumferential surface of the rotor core may also be a polygonal column shape as described above, and as another example, a cylindrical shape is also acceptable. Further, the number of partitioning portions of the magnet holder or the number of magnets may also be a number that is different from that in the above-described preferred embodiments.

The partitioning portion may also protrude farther to the rotating body side on the other side than the top surface of the rotor core without having the convex portion as described above.

The magnet holder may also be fabricated by insert molding, as described above, and may also be independently molded separately from the rotor core.

The plurality of rotating bodies related to various preferred embodiments of the present invention may also have structures different from each other, and the rotor unit according to various preferred embodiments of the present invention may also have four or more of the rotating bodies. For example, two or more of the central rotating bodies may also be disposed between the first rotating body and the second rotating body.

Further, the rotating electrical machine according to various preferred embodiments of the present invention may also be a motor for power steering as described above and may also be a motor which is, for example, used in another site of an automobile. For example, the rotating electrical machine according to various preferred embodiments of the present invention may also be a motor for generating the driving force of an electric automobile. Further, the rotating electrical machine according to various preferred embodiments of the present invention may also be a motor which is used in, for example, an electric power-assisted bicycle, an electric motorcycle, home electric appliances, office equipment, medical equipment, or the like.

Further, it is also possible to provide an electric generator using a structure similar to those of the motors related the above-described preferred embodiments or modified examples thereof. The rotating electrical machine according to various preferred embodiments of the present invention and modifications thereof may also be an electric generator which is used, for example, in an automobile, an electric power-assisted bicycle, wind-power generation, or the like.

Further, the respective elements included in the above-described preferred embodiments or modified examples may also be appropriately combined in a range in which inconsistency does not occur.

The preferred embodiments of the present invention and modifications thereof can be used in a rotor unit, a rotating electrical machine, and a method of manufacturing a rotor unit.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A rotor unit for a rotating electrical machine, comprising:
a plurality of rotating bodies arranged along a central axis; wherein
each of the plurality of rotating bodies includes:
an annular rotor core surrounding the central axis;
a plurality of magnets arranged in a circumferential direction around the rotor core; and
a holder arranged to hold the plurality of magnets;
each of the holders includes a plurality of partitioning portions each axially extending between respective ones of the plurality of magnets;
an axial dimension of the plurality of partitioning portions is longer than an axial dimension of the plurality of magnets held by the plurality of partitioning portions;
the plurality of rotating bodies is disposed in a state in which circumferential positions of the plurality of magnets of respective ones of the plurality of rotating bodies are out of alignment; and
the partitioning portions of one of the holders and the partitioning portions of another one of the holders overlap in an axial direction when viewed from the circumferential direction.

2. The rotor unit according to claim 1, wherein the plurality of rotating bodies include a first rotating body and a second rotating body arranged along the central axis, each of the first rotating body and the second rotating bock includes respective first surfaces and second surfaces, the first surfaces towards each other and the second surfaces facing away from each other;
a holder of each of the first rotating body and the second rotating body further includes a connection portion which connects the plurality of partitioning portions;
the connection portion includes a contact surface which comes into contact with an end portion on a second surface side of the plurality of magnets; and
an axial dimension from the contact surface to an end portion on a first side of the plurality of partitioning portions is longer than the axial dimension of the plurality of magnets.

3. The rotor unit according to claim 2, wherein an axial dimension from the contact surface to an end portion on a first surface side of the rotor core is shorter than an axial dimension from the contact surface to the end portion on a first surface side of the plurality of partitioning portions and longer than the axial dimension of the plurality of magnets.

4. The rotor unit according to claim 3, wherein the rotor core includes an outer circumferential surface of a regular polygonal column shape.

5. The rotor unit according to claim 3, wherein
the plurality of partitioning portions include:
an inner columnar portion which is located farther towards an inside in a radial direction than an outer circumferential surface of the rotor core; and
an outer columnar portion which is located farther towards an outside in the radial direction than the outer circumferential surface of the rotor core;
an end portion of the inner columnar portion adjacent to the first surface side is disposed at an axial position which is equal to or farther from an end portion of the inner columnar portion adjacent to the second surface side than the end portion on the first surface side of the rotor core; and
an end portion of the outer columnar portion adjacent to the first surface is disposed farther towards the first surface than the end portion on the first surface side of the rotor core.

6. The rotor unit according to claim 3, wherein an axial dimension from the contact surface to the end portion on the first surface side of the rotor core is larger than a sum of an axial dimension from the end portion on the first surface side of the rotor core to the end portion on the first surface side of the plurality of partitioning portions and the axial dimension of the plurality of magnets.

7. The rotor unit according to claim 2, wherein the plurality of partitioning portions includes a convex portion provided at an end portion thereof on the first surface side.

8. The rotor unit according to claim 2, wherein the holder of the first rotating body and the holder of the second rotating body have the same shape as each other.

9. The rotor unit according to claim 2, wherein
the holder is a resin member; and
the holder is made of insert molded material so as to be fixed to the surface of the rotor core.

10. The rotor unit according to claim 2, wherein the plurality of rotating bodies further includes a central rotating body which is disposed between the first rotating body and the second rotating body;

a magnet of the first rotating body is disposed between a contact surface of the first rotating body and a partitioning portion of the central rotating body;

a magnet of the central rotating body is disposed between a partitioning portion of the first rotating body and a partitioning portion of the second rotating body; and a magnet of the second rotating body is disposed between a contact surface of the second rotating body and the partitioning portion of the central rotating body.

11. The rotor unit according to claim 10, wherein the partitioning portion of the central rotating body includes:

a first convex portion provided at an end portion thereof on a first rotating body side; and a second convex portion provided at an end portion thereof on a second rotating body side.

12. The rotor unit according to claim 11, wherein the first convex portion protrudes farther towards the first rotating body side than an end portion on the first rotating body side of a rotor core of the central rotating body;

the second convex portion protrudes farther to the second rotating body side than an end portion on the second rotating body side of the rotor core of the central rotating body; and the magnet of the second rotating body comes into contact with both the contact surface of the second rotating body and the second convex portion.

13. The rotor unit according to claim 12, wherein the end portion on the second rotating body side of the rotor core of the central rotating body is disposed farther towards the second rotating body side than a base end portion of the second convex portion.

14. A rotating electrical machine comprising:

a stationary section; and a rotating section which is supported so as to be able to rotate with respect to the stationary section, wherein the rotating section includes:

the rotor unit according to claim 1; and a shaft inserted inside the rotor core; and the stationary section includes:

bearing sections which rotatably support the shaft; and an armature disposed on an outside in a radial direction of the rotor unit.

15. A method of manufacturing a rotor unit for a rotating electrical machine, which includes a plurality of rotating bodies each including an annular rotor core surrounding a central axis, a plurality of magnets arranged in a circumferential direction around the rotor core, and a holder made of resin and arranged to hold the magnets, the method comprising:

(a) insert-molding each of the holders into a shape including a plurality of partitioning portions axially extending along an outer circumferential surface of the rotor core, by disposing the rotor core inside a mold and injecting resin into an inside of the mold;

(b) disposing a respective one of the plurality of magnets between a pair of adjacent ones of the plurality of partitioning portions after step (a); and (c) axially arranging the plurality of rotating bodies fabricated by steps (a) and (b); wherein in step (a), the holder is molded such that an axial dimension of the pair of adjacent ones of the plurality of partitioning portions becomes longer than an axial dimension of the respective one of the plurality of magnets;

in step (c), the plurality of rotating bodies is disposed in a state where circumferential positions of the plurality of magnets of respective ones of the plurality of rotating bodies are out of alignment; and the partitioning portions of one of the holders and the partitioning portions of another one of the holders overlap in an axial direction when viewed from the circumferential direction.

\* \* \* \* \*